United States Patent
Adams

(10) Patent No.: US 9,189,250 B2
(45) Date of Patent: Nov. 17, 2015

(54) METHOD AND SYSTEM FOR RE-INVOKING DISPLAYS

(75) Inventor: James Adams, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 1468 days.

(21) Appl. No.: 12/015,343

(22) Filed: Jan. 16, 2008

(65) Prior Publication Data

US 2009/0183111 A1    Jul. 16, 2009

(51) Int. Cl.
*G06F 3/048*   (2013.01)
*G06F 9/44*    (2006.01)

(52) U.S. Cl.
CPC .................... *G06F 9/4443* (2013.01)

(58) Field of Classification Search
CPC ..................................... G06F 9/4443
USPC .......................................... 715/804
See application file for complete search history.

(56) References Cited

U.S. PATENT DOCUMENTS

| | | | | |
|---|---|---|---|---|
| 5,072,412 A * | 12/1991 | Henderson, Jr. | ...... | G06F 3/0481 715/788 |
| 5,487,143 A * | 1/1996 | Southgate | ...................... | 715/790 |
| 5,606,642 A * | 2/1997 | Stautner | .............. | G10L 19/0204 704/205 |
| 5,668,997 A * | 9/1997 | Lynch-Freshner et al. | ... | 719/329 |
| 5,734,380 A * | 3/1998 | Adams et al. | .................. | 715/804 |
| 5,790,114 A * | 8/1998 | Geaghan et al. | .............. | 715/763 |
| 5,796,403 A | 8/1998 | Adams et al. | | |
| 5,819,055 A * | 10/1998 | MacLean et al. | .............. | 715/798 |
| 5,870,607 A * | 2/1999 | Netzer | ........................... | 717/127 |
| 5,874,958 A * | 2/1999 | Ludolph | ........................ | 715/781 |
| 5,920,315 A | 7/1999 | Santos-Gomez | | |
| 5,977,973 A * | 11/1999 | Sobeski et al. | ................. | 715/798 |
| 6,073,177 A * | 6/2000 | Hebel et al. | .................... | 709/228 |
| 6,175,364 B1 * | 1/2001 | Wong et al. | .................... | 715/763 |
| 6,188,402 B1 * | 2/2001 | Csipkes et al. | ................. | 715/705 |
| 6,320,602 B1 * | 11/2001 | Burkardt et al. | ............... | 715/817 |

(Continued)

FOREIGN PATENT DOCUMENTS

| | | | | |
|---|---|---|---|---|
| EP | 0558224 A1 | 9/1993 | | |
| WO | WO 98/13747 | * | 4/1998 | .............. G06F 3/033 |
| WO | WO 98/13751 | * | 4/1998 | .............. G06F 3/033 |

OTHER PUBLICATIONS

Windows 98 article from Wikipedia (see http://en.wikipedia.org/wiki/Windows_98, last accessed Apr. 13, 2013.*

(Continued)

*Primary Examiner* — Jessica Chuang
(74) *Attorney, Agent, or Firm* — Jetter & Associates, P.A.

(57) ABSTRACT

A method (600) for recovering a set of display screen windows (402, 404, 406, 408) in a multi-window display screen (304). The method involves retaining window information as stored window information (SWI). The SWI includes a first arrangement for a first set of display screen windows (DSWs) displayed on the multi-window display screen at a first time. Each of the DSWs has respective content (420, 422, 424, 426). The method also involves using the SWI for redisplaying the first set of display screen windows in the first arrangement on the multi-window display at a second time. The second time is after the first time and follows an event causing the first set of display screen windows to be removed from the multi-window display screen. The redisplayed DSWs contain at least a portion of the respective content.

4 Claims, 6 Drawing Sheets

(56) References Cited

U.S. PATENT DOCUMENTS

| | | | |
|---|---|---|---|
| 6,360,331 B2* | 3/2002 | Vert et al. | 714/4.4 |
| 6,480,944 B2* | 11/2002 | Bradshaw et al. | 711/162 |
| 6,699,127 B1* | 3/2004 | Lobb et al. | 463/43 |
| 6,931,422 B1* | 8/2005 | Gusler et al. | |
| 6,993,399 B1* | 1/2006 | Covell | H04N 21/8547 |
| | | | 348/515 |
| 7,174,361 B1* | 2/2007 | Paas | G06F 9/4443 |
| | | | 709/203 |
| 7,484,181 B2* | 1/2009 | Duperrouzel et al. | 715/788 |
| 7,502,838 B2* | 3/2009 | Franco et al. | 709/219 |
| 7,530,026 B2* | 5/2009 | Chaudhri et al. | 715/764 |
| 7,689,921 B2* | 3/2010 | Rajarajan et al. | 715/744 |
| 7,716,461 B2* | 5/2010 | Downer et al. | 713/1 |
| 7,793,232 B2* | 9/2010 | Chaudhri et al. | 715/802 |
| 7,814,423 B2* | 10/2010 | Musson et al. | 715/744 |
| 7,817,163 B2* | 10/2010 | Hanggie et al. | 345/619 |
| 7,827,136 B1* | 11/2010 | Wang et al. | 707/610 |
| 7,941,404 B2* | 5/2011 | Garimella et al. | 707/649 |
| 8,112,717 B1* | 2/2012 | Akella et al. | 715/788 |
| 8,346,887 B1* | 1/2013 | Kembel et al. | 709/217 |
| 8,402,115 B2* | 3/2013 | Franco et al. | 709/219 |
| 8,566,732 B2* | 10/2013 | Louch | G06F 9/4443 |
| | | | 715/764 |
| 8,732,447 B2* | 5/2014 | Jitkoff | G06F 1/3203 |
| | | | 713/2 |
| 9,003,299 B2* | 4/2015 | Freedman | H01B 7/292 |
| | | | 715/745 |
| 2001/0003846 A1* | 6/2001 | Rowe et al. | 725/47 |
| 2001/0037475 A1* | 11/2001 | Bradshaw et al. | 714/15 |
| 2002/0023178 A1* | 2/2002 | Strasnick et al. | 709/329 |
| 2003/0097640 A1* | 5/2003 | Abrams | G06F 17/241 |
| | | | 715/255 |
| 2003/0144991 A1* | 7/2003 | Arrouye et al. | 707/1 |
| 2003/0225758 A1* | 12/2003 | Yamasaki | 707/3 |
| 2004/0027398 A1* | 2/2004 | Jaeger | 345/863 |
| 2004/0153973 A1* | 8/2004 | Horwitz | 715/530 |
| 2004/0199574 A1* | 10/2004 | Franco et al. | 709/201 |
| 2005/0034083 A1* | 2/2005 | Jaeger | 715/863 |
| 2005/0088449 A1* | 4/2005 | Blanco et al. | 345/547 |
| 2005/0108277 A1* | 5/2005 | Arrouye et al. | 707/102 |
| 2005/0193225 A1* | 9/2005 | Macbeth et al. | 714/2 |
| 2005/0223336 A1 | 10/2005 | Plow et al. | |
| 2006/0173866 A1* | 8/2006 | Newport | 707/100 |
| 2007/0038939 A1* | 2/2007 | Challen et al. | 715/734 |
| 2007/0141898 A1* | 6/2007 | Mayette | H01R 13/6315 |
| | | | 439/502 |
| 2007/0198527 A1* | 8/2007 | Rasmussen | 707/10 |
| 2007/0211079 A1* | 9/2007 | Nixon et al. | 345/619 |
| 2007/0243928 A1* | 10/2007 | Iddings | 463/26 |
| 2008/0005509 A1* | 1/2008 | Smith et al. | 711/162 |
| 2008/0134018 A1* | 6/2008 | Kembel et al. | 715/234 |
| 2008/0162378 A1* | 7/2008 | Levine et al. | 705/36 R |
| 2008/0163202 A1* | 7/2008 | Kembel et al. | 717/178 |
| 2008/0231546 A1* | 9/2008 | Li | 345/3.4 |
| 2008/0240683 A1* | 10/2008 | Yamagata et al. | 386/96 |
| 2008/0256487 A1* | 10/2008 | Kim et al. | 715/810 |
| 2008/0313282 A1* | 12/2008 | Warila et al. | 709/206 |
| 2009/0013086 A1* | 1/2009 | Greenbaum | H04L 12/1822 |
| | | | 709/231 |
| 2009/0118001 A1* | 5/2009 | Kelly et al. | 463/29 |
| 2009/0150486 A1* | 6/2009 | Franco et al. | 709/203 |
| 2009/0307627 A1* | 12/2009 | Adams | G06F 9/4443 |
| | | | 715/781 |
| 2010/0211906 A1* | 8/2010 | Kanai | 715/779 |
| 2012/0066631 A1* | 3/2012 | Rasmussen | 715/769 |
| 2012/0110481 A1* | 5/2012 | Akella et al. | 715/760 |
| 2013/0024499 A1* | 1/2013 | Franco et al. | 709/203 |
| 2013/0246074 A1* | 9/2013 | Taleb | G10L 19/02 |
| | | | 704/500 |

OTHER PUBLICATIONS windows_98_foundation manual (see http://gjr.k12.pa.us/Student/cct/Library/windows_98_foundation/manual/web/windows_98_foundation_manual_educational_web p15.htm, last accessed Apr. 13, 2013.*

* cited by examiner

METHOD AND SYSTEM FOR RE-INVOKING DISPLAYS

FIELD OF THE INVENTION

The invention concerns display systems and methods for recovering display information.

BACKGROUND

There are many types of industrial plant control systems (IPCS) known in the art for controlling industrial equipment and processes. One such conventional IPCS 100 is shown in FIG. 1A. As shown in FIG. 1A, the IPCS 100 includes a primary server 102, an operator computing system 110, a secondary (or back-up) server 104, a plant control system 106, and industrial equipment 108. The plant control system 106 has a distributed network configuration, i.e., there are application specific modules connected to each other, industrial equipment, and operator interfaces via a local control network.

Each of the components 102, 110, 106, 108 is well known to those having ordinary skill in the art, and therefore will not be described in detail herein. However, it should be understood that the operator computing system 110 is configured to enable the control of the industrial equipment 108 by an operator (not shown). As such, the operator computing system 110 includes a user interface 130 and a processing device 132. The user interface 130 is often comprised of a keyboard (not shown), a mouse (not shown), a display screen 112, and the like. The display screen 112 and processing device 132 collectively display a set of display windows 114, 116, 118, 120 to the operator (not shown). The phrase "display window" as used herein refers to a visual area of the display screen 112 configured to display at least one graphical user interface (GUI). GUIs are well known to those skilled in the art, and therefore will not be described herein.

If the primary server 102 is online, then the primary server 102 provides a means to select a plurality of monitor-control graphical user interfaces (MCGUIs) 122, 124, 126, 128 to be displayed in the display windows 114, 116, 118, 120. The phrase "monitor-control graphical user interface" as used herein refers to a graphical user interface which displays information and generally provides command control for monitoring and/or controlling applications, such as for an industrial process or industrial equipment. Alternatively, if the primary server 102 is offline and the secondary server 104 is online, then the secondary server 104 performs actions to select a plurality of monitor-control graphical user interfaces (MCGUIs) 122, 124, 126, 128 to be displayed in the display windows 114, 116, 118, 120.

The MCGUIs 122, 124, 126, 128 typically include a text display area (not shown), a video display area (not shown), an image display area (not shown), command buttons (not shown), scroll bars (not shown), and/or the like. Each of the MCGUIs 122, 124, 126, 128 is displayed in a particular display window 114, 116, 118, 120. For example, an MCGUI 122 is displayed in the display window 114. Similarly, the MCGUI 124 is displayed in the display window 116. Likewise, the MCGUI 126 is displayed in the display window 118. The MCGUI 128 is displayed in the display window 120. However, it should be understood that more than one GUI can be displayed in each of the display windows 114, 116, 118, 120.

Despite certain advantages of such a conventional IPCS 100, it suffers from certain drawbacks. For example, if the primary server 102 fails, then the secondary server 104 performs a re-set process to re-set the MCGUIs 122, 124, 126, 128. During this re-set process, the display windows 114, 116, 118, 120 are shut-down and each of the MCGUIs 122, 124, 126, 128 is re-invoked. As a result of the re-invocation process, the MCGUIs 122, 124, 126, 128 reappear in a random order on the display screen 112 as shown in FIG. 1B. Stated differently, each of the MCGUIs 122, 124, 126, 128 reappears in a respective display window that is generally different from the previous arrangement of GUIs in the previous respective display window. One can appreciate that the randomly ordered MCGUIs 122, 124, 126, 128 may result in operator confusion. The randomly ordered MCGUIs 122, 124, 126, 128 may also result in improper operator actions that can cause a failure of an industrial process or an abnormality in the industrial process.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

The present invention concerns methods and related implementing systems for recovering a set of display screen windows in a multi-window display screen. The methods generally involve retaining stored window information. The window information comprises a first arrangement for a first set of display screen windows displayed on a multi-window display screen at a first time. Each of the display screen windows has respective content. The methods also involve using the stored window information for redisplaying the first set of display screen windows in the first arrangement on the multi-window display at a second time after the first time. The second time follows an event (e.g., loss of power) causing the first set of display screen windows to be removed from the multi-window display screen. The redisplayed display screen windows contain at least a portion of the respective content.

BRIEF DESCRIPTION OF THE DRAWINGS

Embodiments will be described with reference to the following drawing figures, in which like numerals represent like items throughout the figures, and in which.

DETAILED DESCRIPTION OF THE DRAWINGS

Embodiments of the invention provide methods and related implementing systems for re-invoking a set of graphical user interfaces in a manner that retains their original positions in a display screen. The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Before describing method embodiments of the present invention, it will be helpful in understanding an exemplary environment in which the methods can be utilized. In this regard, it should be understood that the methods of the present invention can be utilized in any application where an operator monitors multiple display screen windows. Such applications include, but are not limited to, industrial plant control applications, medical applications, security applications, and navigation applications. Accordingly, methods of the present invention will now be described in relation to one particular application, namely, the industrial plant control application.

Figure 2:
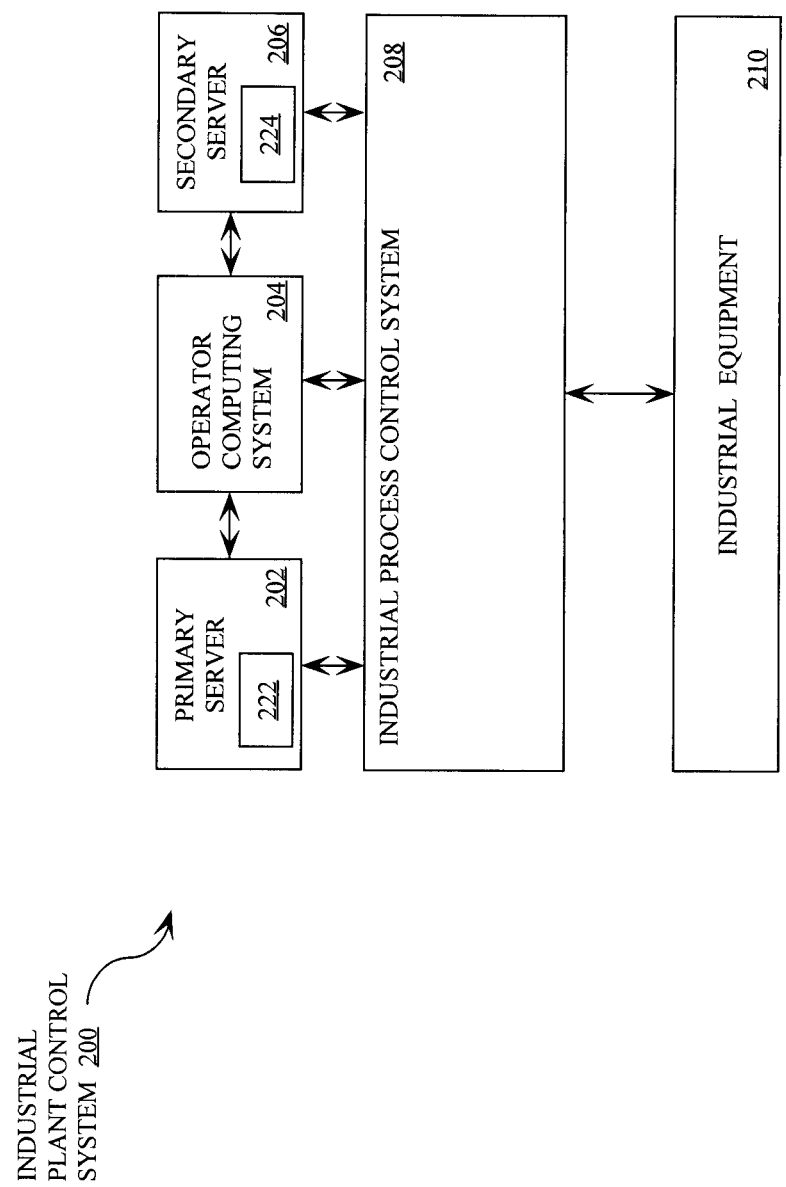
FIG. 2 is a block diagram of an industrial plant control system including an operator computing system according to an embodiment of the invention.

Referring now to FIG. 2, there is provided a block diagram of an exemplary industrial plant control system 200 according to an embodiment of the invention. As shown in FIG. 2, the control system 200 comprises a primary server 202, an operator computing system 204, a secondary server 206, an industrial process control system (IPCS) 208, and industrial equipment 210. Servers 202, 206 are well known to those skilled in the art, and therefore will not be described in detail herein. However, it should be understood that the primary server 202 is configured to perform application specific actions for controlling an industrial process and equipment. As known in the art, if the primary server 202 is manually taken offline or fails, then the secondary server 206 takes over and begins performing application specific actions for controlling an industrial process and equipment. As should be understood, the primary server 202 can be manually taken offline for maintenance and/or component replacement. The primary server 202 can fail as a result of unintentional events, such as a power surge, a power loss, a system crash, application crash, or a component failure.

Referring again to FIG. 2, the servers 202, 206 and the IPCS 208 collectively control an industrial process and equipment 210. In one non-limiting application, the IPCS 208 can be the control system described in U.S. Pat. No. 5,796,403 and U.S. Pat. No. 5,734,380. In such a scenario, the IPCS 208 is generally a distributed control system, i.e., there are application specific modules connected to each other, industrial equipment, and operator interfaces via a local control network. The industrial equipment 210 may include, but are not limited to, gauges, valves, transmitters, actuators, and sensors. The invention is not limited in this regard.

As shown in FIG. 2, each of the servers 202, 206 is configured to communicate with the operator computing system 204 for displaying monitor and/or control information to an operator (not shown). The term "operator" as used herein refers to one or more users of the operator computing system 204. In this regard, it should be understood that the servers 202, 206 can be configured to receive information from the operator computing system 204 and/or the industrial process control system 208. Such information generally includes, but is not limited to, display screen window identification information (described below in relation to FIG. 3), display screen window attribute information (described below in relation to FIG. 3), monitor-control graphical user interface identification information (describe below in relation to FIG. 3), and monitor-control graphical user interface location information (describe below in relation to FIG. 3). Each of the servers 202, 206 is generally comprised of a memory device 222, 224 for storing the received information.

The operator computing system 204 may be a desktop personal computer system, a laptop personal computer system, a personal digital assistant, a mobile computing device, or any other general purpose computer processing device. Accordingly, the operator computing system 204 is configured to display content in display screen windows. The phrase "display screen window" as used herein refers to a visual area of a display screen containing content. Such content can include, but is not limited to, still images, video images, an animated image, text, graphs, charts, data, graphical user interfaces (GUIs), or any other information useful in monitoring an area of interest and/or controlling a desired process. In the industrial process scenario, the GUIs can contain information necessary for enabling an operator (not shown) to monitor and/or control an industrial process or equipment. Such information includes, but is not limited to, real-time images of industrial equipment (e.g., a tank filled with a liquid), data indicating temperature of a particular area of an industrial plant, data indicating temperature of a liquid used in an industrial process, and data indicating how much liquid is in a particular container.

Figure 3:
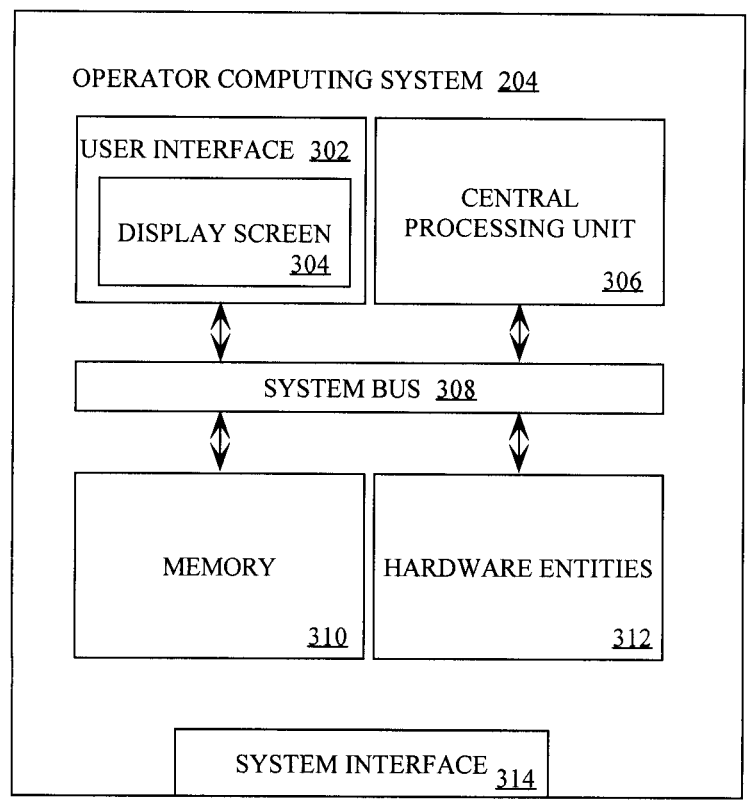
FIG. 3 is a more detailed block diagram of the operator computer system shown in FIG. 2.

Referring now to FIG. 3, there is provided a more detailed block diagram of the operator computer system 204 of FIG. 2. As shown in FIG. 3, the operator computer system 204 is comprised of a system interface 314, a user interface 302, a central processing unit 306, a system bus 308, a memory 310 connected to and accessible by other portions of the operator computer system 204 through the system bus 308, and hardware entities 312 connected to the system bus 308. At least some of the hardware entities 312 perform actions involving access to and use of the memory 310, which for example may be a random access memory (RAM), a disk driver, and/or a compact disc read only memory (CD-ROM).

The hardware entities 312 may include microprocessors, application specific integrated circuits (ASICs), or other hardware. The hardware entities 312 may include a microprocessor programmed for communicating with a primary and secondary server 202, 206. More particularly, the hardware entities 312 may include a microprocessor programmed for communicating display screen window (DSW) identification and attribute information to the primary and secondary server 202, 206. Such DSW identification information generally includes, but is not limited to, a unique string of letters or numbers associated with a particular DSW (described below in relation to FIG. 4). Such DSW attribute information can include, but is not limited to, DSW location information and DSW specification information. The DSW location information indicates a pre-defined region of a display screen in which a particular DSW (described below in relation to FIG. 4) exists prior to a system failure. The DSW attribute information can include, but is not limited to, (a) information indicating whether a particular DSW can be resized by an operator, (b) information indicating whether a particular DSW can be closed, (c) information indicating whether a particular DSW can be minimized, and/or (d) information indicating whether a particular DSW remains visible even when its territory overlaps another DSW.

The hardware entities 312 may also include a microprocessor programmed for communicating DSW content information to the primary and secondary server 202, 206. For example, if the DSW content is a monitor-control graphical user interface (MCGUI), then the microprocessor can be programmed for communicating monitor-control graphical user interface (MCGUI) identification and location information to the primary and secondary server 202, 206. As stated above, the phrase "monitor-control graphical user interface" as used herein refers to a graphical user interface which displays information and generally provides command control for monitoring and/or controlling applications, such as for an industrial process or industrial equipment. Such MCGUI identification information can include, but is not limited to, a unique string of letter or numbers associated with a particular MCGUI (described below in relation to FIG. 4). Such MCGUI location information can indicate which DSW (described below in relation to FIG. 4) a particular MCGUI (described below in relation to FIG. 4) is displayed in prior to a system failure. The hardware entities 312 may further include a microprocessor programmed for communicating with the primary and secondary server 202, 206 for selecting one or more MCGUIs (described below in relation to FIG. 4) to be displayed in each of the DSWs (described below in relation to FIG. 4).

The user interface 302 is generally comprised of input devices, output devices, and software routines configured to allow a user to interact with and control software applications installed on the operator computer system 204. Such input and output devices include, but are not limited to, a display screen 304, a speaker (not shown), a keypad (not shown), a directional pad (not shown), a directional knob (not shown), and a microphone (not shown). As such, the user interface 302 can facilitate a user-software interaction for communicating with the primary and second servers 202, 206. The user interface 302 can also facilitate a user-software interaction for selecting a mode for the display screen 304, such as a single window mode or a multi-window mode. In the single window mode, a single DSW is displayed in a pre-defined region of the display screen 304. In the multi-window mode, two or more DSWs are displayed in pre-defined regions of the display screen 304. It should be well known to those skilled in the art that a display screen 304 may be comprised of either a single physical device, or multiple physical devices, such as cathode ray tubes (CRTs) or liquid crystal displays (LCDs) or other similar such devices. The user interface 302 can further facilitate a user-software interaction for selecting desired content to be displayed in one or more DSWs (described below in relation to FIG. 4).

The system interface 314 allows the operator computer system 204 to communicate directly or indirectly with the primary and secondary servers 202, 206. If the operator computer system 204 is communicating indirectly with the servers 202, 206, then the operator computer system 204 is sending and receiving communications through a network (not shown). For example, the network (not shown) can be a wireless network such as a local area network, a wide area network, or a personal area network.

Figure 4:
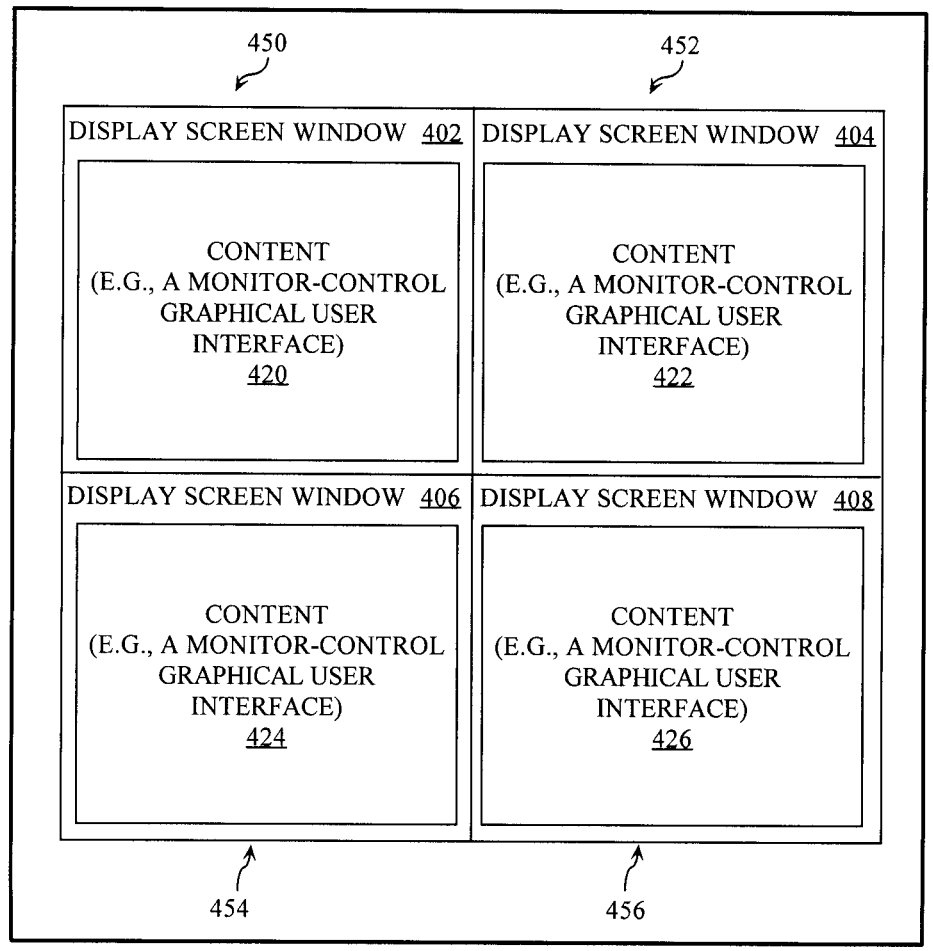
FIG. 4 is a schematic illustration of the display screen of FIG. 3 having a plurality of display windows and monitor-control graphical user interfaces displayed therein.

Referring now to FIG. 4, there is provided a schematic illustration of the display screen 304 of FIG. 3 having four (4) DSWs 402, 404, 406, 408 and four (4) MCGUIs 420, 422, 424, 426 displayed therein. The invention is not limited in this regard. The display screen 304 can have any number N of DSWs displayed therein, wherein N is selected in accordance with a particular display screen 304 application. Also, although FIG. 4 shows one MCGUI per DSW, each of the DSWs can contain more than one MCGUI. Furthermore, each of the DSWs can include content other than MCGUIs, such as still images, video images, an animated image, text, graphs, charts, and data useful in monitoring an area of interest, and data useful in controlling a desired process.

As shown in FIG. 4, each of the DSWs 402, 404, 406, 408 exists in a pre-defined area (or region) 450, 452, 454, 456 of the display screen 304. For example, the DSW 402 exists in the upper left area (or region) 450 of the display screen 304. Similarly, the DSW 404 exists in the upper right area (or region) 452 of the display screen 304. Likewise, the DSW 406 exists in the lower left area (or region) 454 of the display screen 304. DSW 408 exists in the lower right area (or region) 456 of the display screen 304. However, the invention is not limited in this regard. The DSWs 402, 404, 406, 408 can exist in any pre-defined area (or region) selected in accordance with a particular display screen 304 application, and be in general any total number.

As shown in FIG. 4, each of the DSWs 402, 404, 406, 408 contains certain content. For example, if the content is selected to include MCGUIs, then the DSW 402 may contain the MCGUI 420. Similarly, the DSW 404 may contain the MCGUI 422. Likewise, the DSWs 406, 408 may contain the MCGUIs 424, 426, respectively.

Figure 5:
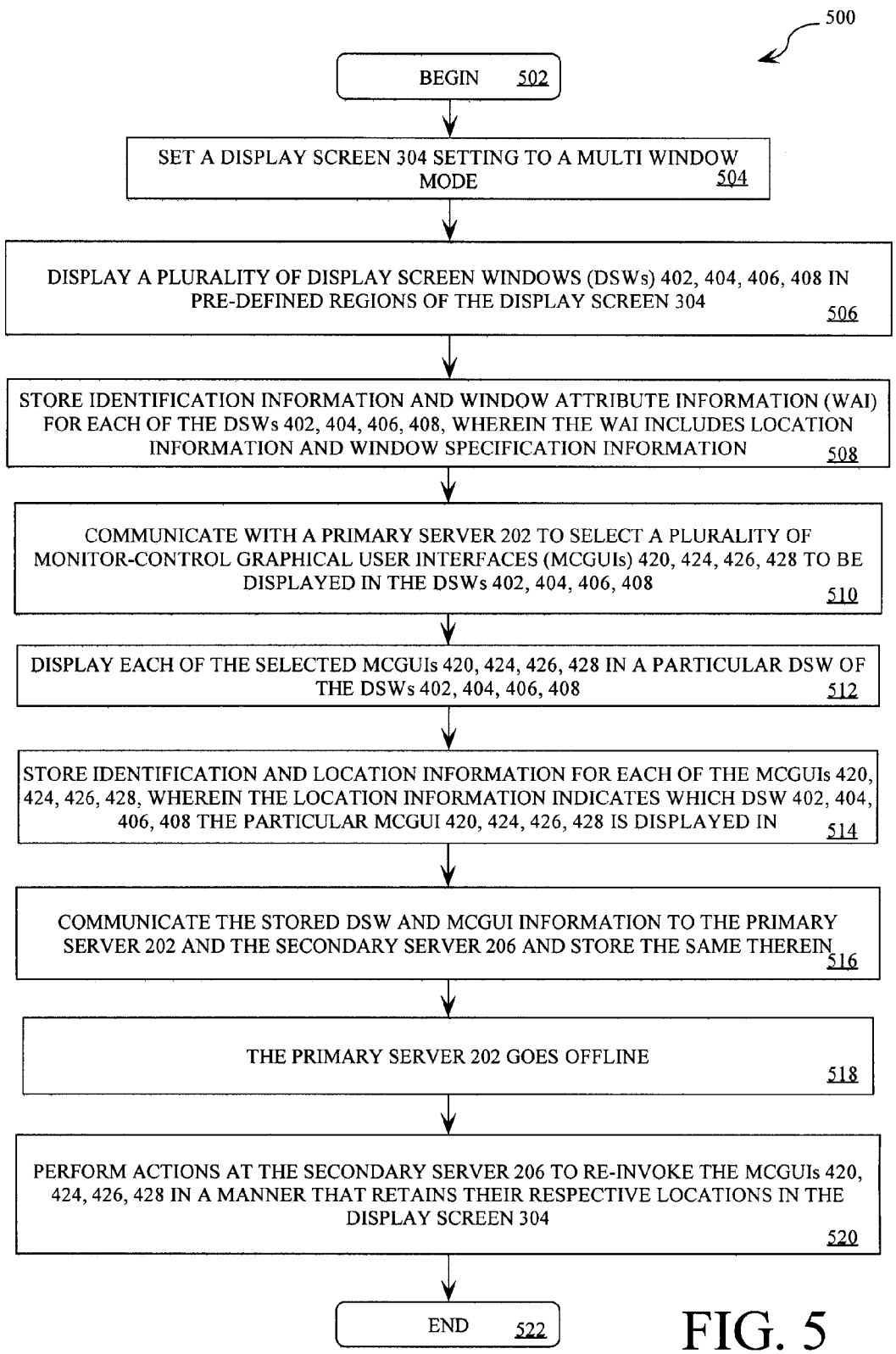
FIG. 5 is a flow diagram of method for displaying display windows and monitor-control graphical user interfaces in a display screen according to an embodiment of the invention.
Figure 6:
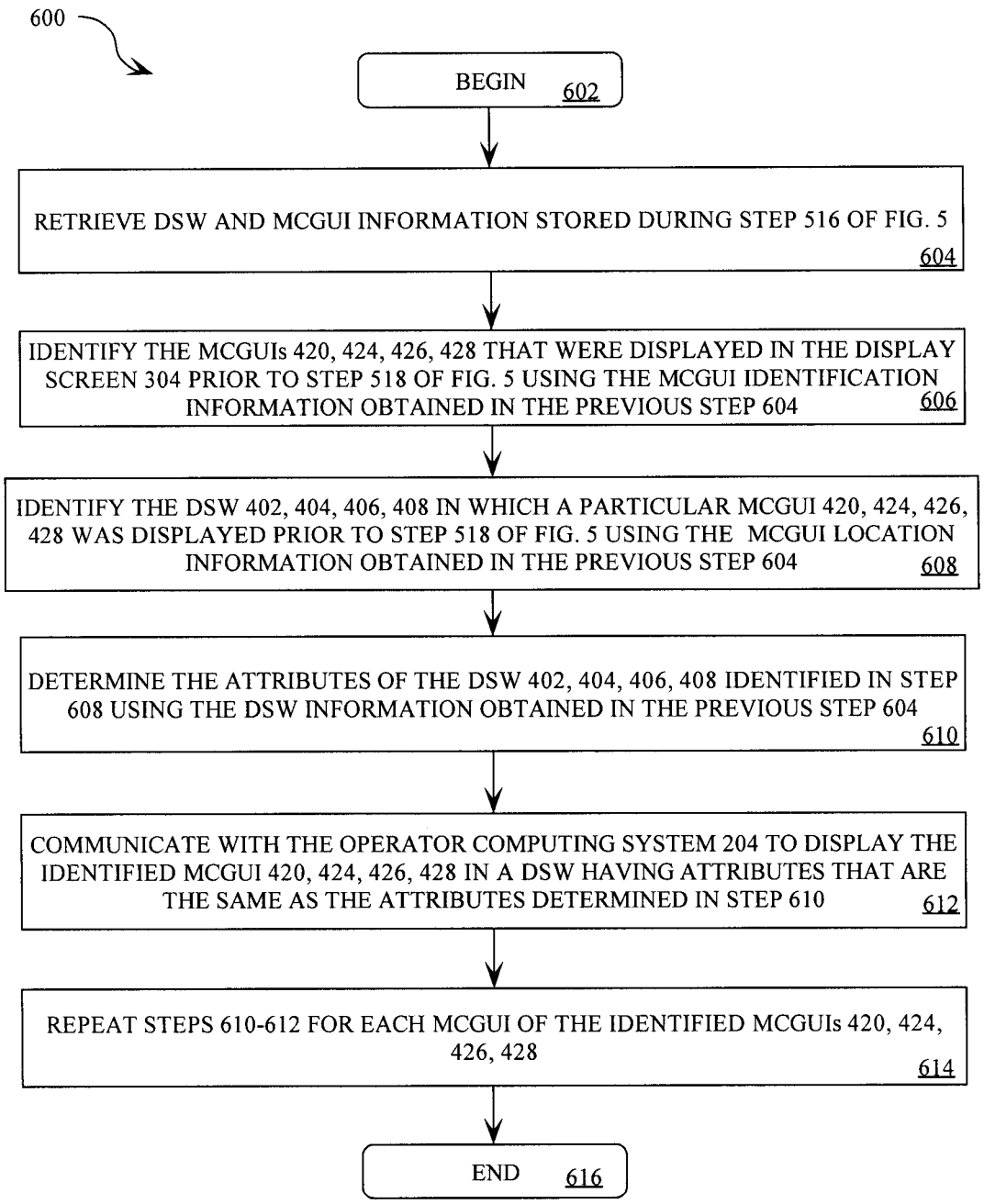
FIG. 6 is a flow diagram of a re-invocation process described in FIG. 5.

FIGS. 5-6 and accompanying text described below illustrate an exemplary method 500 according to an embodiment of the invention. The method 500 is provided for (a) displaying display screen windows (DSWs) and graphical user interfaces (GUIs) in a display screen and (b) re-invoking the GUIs in a manner that retains their original display screen arrangement. It should be appreciated, however, that the method disclosed herein is provided for purposes of illustration only and that the present invention is not limited solely to the particular method shown. For example, as described above, there can be more than one MCGUI per DSW.

Referring now to FIG. 5, the method 500 begins at step 502 and continues with step 504. In step 504, an operator performs actions to set a display screen 304 setting to a multi-window mode. Such operator actions can be achieved utilizing the user interface 302 of the operator computer system 204. Subsequently, the method 500 continues with step 506. In step 506, two or more DSWs 402, 404, 406, 408 are displayed in pre-defined regions of the display screen 304. Thereafter, step 508 is performed where identification and attribute information for each DSW is retained as stored window information. The attribute information can include, but is not limited to, DSW location information and DSW specification information. The DSW location information indicates a pre-defined region (e.g., upper left) of a display screen 304 in which a particular DSW exists prior to a system failure. The DSW attribute information can include information indicating whether a particular DSW always exists in an upper region of the display screen, information indicating whether a particular DSW can be closed, information indicating whether a particular DSW can be minimized, or other attribute information.

After step 508, the method 500 continues with step 510. In step 510, the operator computer system 204 performs actions to communicate with a primary server to select two or more MCGUIs 420, 424, 426, 428 to be displayed in the DSWs 402, 404, 406, 408. Such actions can generally include generating messages, sending generated messages to the primary server, receiving messages from the primary server, processing received messages to obtain data therefrom, and displaying the data (e.g., a set of MCGUIs) to an operator. As should be understood, the computer system actions can be performed in response to an operator (not shown) action. Thereafter, step 512 is performed where each of the selected MCGUIs 420, 424, 426, 428 is displayed in a particular DSW 402, 404, 406, 408. In step 514, identification and location information for each MCGUI 420, 424, 426, 428 is retained as stored window information, such as in the memory device 310 of the operator computer system 204. The MCGUI location information can indicate which DSW 402, 404, 406, 408 the particular MCGUI 420, 424, 426, 428 is displayed in. Subsequently, step 516 is performed where the DSW and MCGUI information are communicated, such as from the operator computer system 204 to a primary and secondary server, such as the primary and secondary servers 202, 206. In this regard, it should be understood that the information can be communicated to a primary server for purposes of maintaining a historical list of the content displayed to an operator. At the primary and secondary server 202, 206, the received information can be stored in the memory devices 222, 224, respectively.

After step 516, the method 500 continues with step 518. In step 518, the primary server 202 unintentionally goes offline or is intentionally taken offline. The term "offline" as used herein means that a computing device is not connected or available to another computing device or network. For example, if the primary server 202 needs maintenance, then the primary server 202 may be intentionally taken offline. In contrast, if the primary server 202 fails, then the primary server 202 is unintentionally taken offline. Subsequent to step 518, step 520 is performed.

Figure 1B:
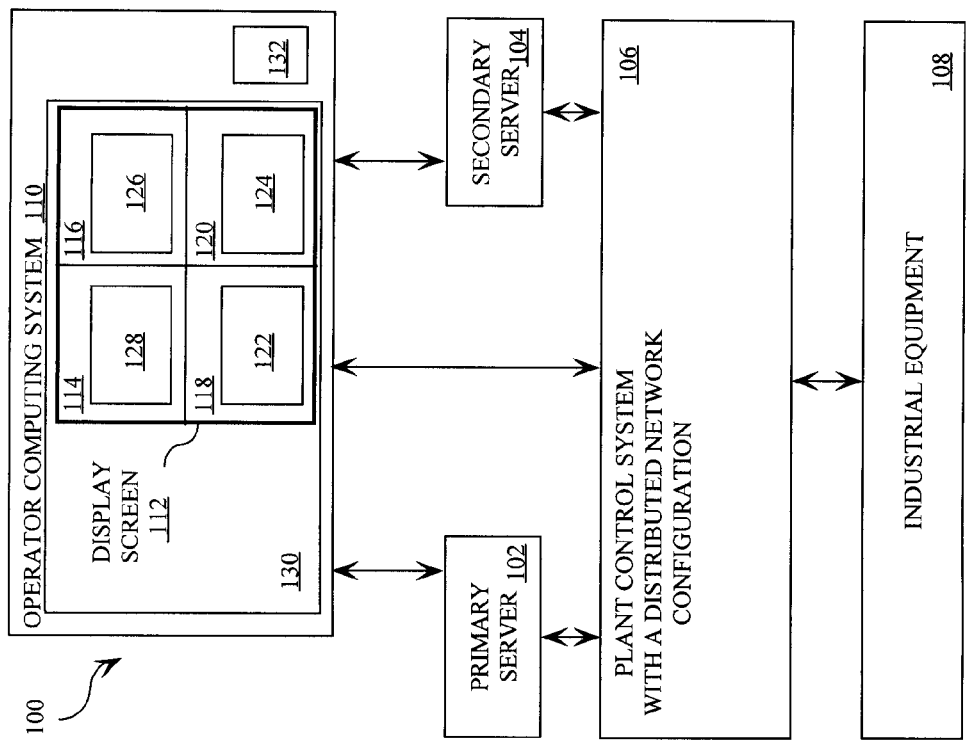
FIG. 1B is a block diagram of a conventional industrial plant control system having a display screen with window displays and monitor-control graphical user interfaces displayed in a second arrangement different from the first arrangement of FIG. 1A.
Figure 1A:
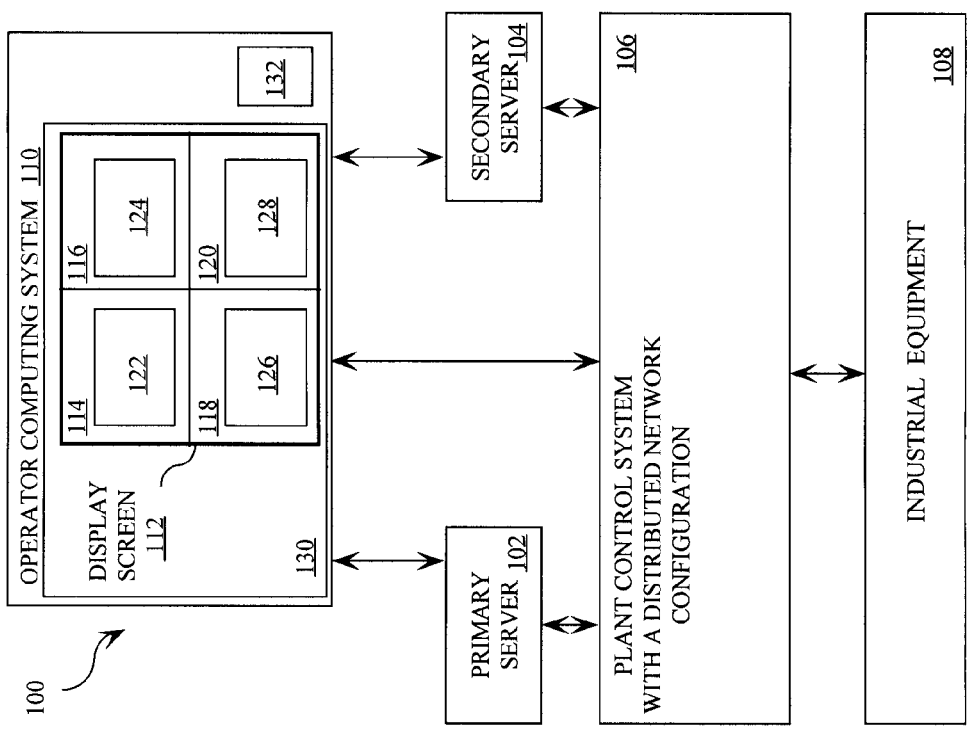
FIG. 1A is a block diagram of a conventional industrial plant control system having a display screen with window displays and monitor-control graphical user interfaces displayed in a first arrangement.

In step 520, the secondary server 206, which has stored DSW and MCGUI information, performs actions to re-invoke the MCGUIs 420, 424, 426, 428 in a manner that retains their respective previous locations in the display screen 304 that existed prior to the primary server going offline. Stated differently, the prior detailed arrangement and attributes of the DSWs 402, 404, 406, 408 are retained as well as the display screen locations of the MCGUIs 420, 424, 426, 428. As such, the MCGUIs 420, 424, 426, 428 can be re-displayed to an operator (not shown) in a configuration that is based on the former configuration (i.e., the display screen configuration presented prior to step 518). The conventional system drawback (described in relation to FIGS. 1A-1B) of a re-invocation process resulting in randomly ordered display screen content (e.g., MCGUIs) is thus overcome. A process for re-invoking the MCGUI 420, 424, 426, 428 will be described below in relation to FIG. 6. Upon re-invoking the MCGUI 420, 424, 426, 428, step 522 is performed where the method 500 ends.

Referring now to FIG. 6, there is provided a flow diagram of a re-invocation process 600 performed in step 520 of FIG. 5. As shown in FIG. 6, the re-invocation process 600 begins at step 602 and continues with step 604. In step 604, the secondary server 206 performs actions to access its internal memory 224. The secondary server 206 also performs actions to retrieve DSW and MCGUI information from its internal memory 224. It should be noted that the DSW and MCGUI information retrieved in step 604 is the same DSW and MCGUI information stored in the memory 224 during step 516 of FIG. 5.

In step 606, MCGUIs 420, 424, 426, 428 are identified. Notably, the identified MCGUIs 420, 424, 426, 428 are the MCGUIs that were displayed in the display screen 304 prior to step 518 of FIG. 5. This MCGUI identification can be provided using the MCGUI identification information obtained in the previous step 604. Subsequent to completing step 606, step 608 is performed where an identification is made. More particularly, the DSW 402, 404, 406, 408 in which a particular MCGUI 420, 424, 426, 428 was displayed in prior to step 518 of FIG. 5 is identified. This identification can be made using the MCGUI location information obtained in the previous step 604. Thereafter, step 610 is performed where the attributes of the DSW 402, 404, 406, 408 identified in step 608 are determined. This attribute determination is made using the DSW attribute information obtained in the previous step 604. The attribute information can include, but is not limited to, information indicating a location, size, and behavioral characteristic of the DSW 402, 404, 406, 408. Such behavioral characteristics include, but are not limited to, closable characteristic, a minimizable characteristic, a maximizable characteristic, a draggable (or movable) characteristic, and a resizable characteristic.

Upon completing step 610, step 612 is performed. In step 612, the secondary server 206 performs actions to communicate with the operator computer system 204 for displaying the identified MCGUI 420, 424, 426, 428 in accordance with the respective DSW 402, 404, 406, 408. Stated differently, the identified MCGUI 420, 424, 426, 428 is re-displayed in a display screen window of a second set of display screen windows having attributes that are the same as attributes of the identified display screen window. Such attributes include, but are not limited to, location, size, and behavioral characteristics (e.g., closable, minimizable, maximizable, draggable, and resizable). In step 614, steps 610-612 are repeated for each MCGUI of the identified MCGUIs 420, 424, 426, 428. Upon completing step 614, step 616 is performed where the re-invocation process 600 ends.

In light of the forgoing description of the invention, it should be recognized that the present invention can be realized in hardware, software, or a combination of hardware and software. A method for decoding an encoded sequence according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

I claim:

1. A method for recovering content and its arrangement in a set of display screen windows (DSWs) displayed in a plurality of display screens, comprising:
   receiving real-time content in a plurality of monitor-control graphical user interfaces (MCGUIs) from a first server over a communications network, wherein the real-time content includes data retrieved from an industrial process;
   displaying a first arrangement including the plurality of MCGUIs, including the real-time content, rendered within the set of DSWs displayed across the plurality of display screens;
   using a processor programmed for communicating with the first server and a second server, without any user input automatically transmitting first identification information, first location information, specification information, behavioral characteristic information, and MCGUI data for each of the set of DSWs displayed across the plurality of display screens;
   wherein the first location information indicates a pre-defined region of each of the set of DSWs prior to a system failure;
   wherein the behavioral characteristic information includes information whether each of the set of DSWs is closable, minimizable, maximizable, draggable, resizable or whether the DSW remains visible when it overlaps with another DSW;
   wherein the MCGUI data comprises second identification information and second location information for each of the plurality of MCGUIs within each of the set of DSWs;
   wherein the second location information in the MCGUI data indicates which DSW in the set of DSWs a particular MCGUI is located and displayed in prior to the system failure as represented in the first arrangement;
   detecting the system failure of the first server that unintentionally goes offline or is intentionally taken offline;
   shutting down the set of DSWs and the plurality of MCGUIs displayed on the plurality of display screens;
   receiving DSW data for each of the set of DSWs comprising the first identification information, the first location information, the specification information and the behavioral characteristic information of each of the set of DSWs and the MCGUI data comprising the second identification information and the second location information for each of the plurality of MCGUIs within each of the set of DSWs from the second server over the communications network; and
   re-displaying on the plurality of display screens the plurality of MCGUIs in the set of DSWs in the first arrangement before the system failure of the first server using the DSW data for each of the set of DSWs and the MCGUI data for each of the plurality of MCGUIs within each of the set of DSWs received from the second server.

2. The method according to claim 1, wherein said real-time content includes at least one of a still image, a video image, an animated image, text, a graph, and a chart.

3. A control system, comprising:
   a plurality of display screens; and
   a computing device configured for:
   receiving real-time content in a plurality of monitor-control graphical user interfaces (MCGUIs) from a first server over a communications network, wherein the real-time content includes data retrieved from an industrial process;
      displaying a first arrangement including the plurality of MCGUIs, including the real-time content, rendered within a set of display screen windows (DSWs) displayed in the plurality of display screens;
      automatically transmitting without any user input first identification information, first location information, specification information, behavioral characteristic information, and MCGUI data for each of the set of DSWs displayed across the plurality of display screens;
      wherein the first location information indicates a pre-defined region of each of the set of DSWs prior to a system failure;
   wherein the behavioral characteristic information includes information whether each of the set of DSWs is closable, minimizable, maximizable, draggable, resizable or whether the DSW remains visible when it overlaps with another DSW;
   wherein the MCGUI data comprises second identification information and second location information for each of the plurality of MCGUIs within each of the set of DSWs;
   wherein the second location information in the MCGUI data indicates which DSW in the set of DSWs a particular MCGUI is located and displayed in prior to the system failure as represented in the first arrangement;
      detecting the system failure of the first server that unintentionally goes offline or is intentionally taken offline;
      shutting down the set of DSWs and the plurality of MCGUIs displayed on the plurality of display screens;
      receiving DSW data for each of the set of DSWs comprising the first identification information, the first location information, the specification information and the behavioral characteristic information of each of the set of DSWs and the MCGUI data comprising the second identification information and the second location information for each of the plurality of MCGUIs within each of the set of DSWs from a second server over the communications network; and
      re-displaying on the plurality of display screens the plurality of MCGUIs in the set of DSWs in the first arrangement before the system failure of the first server using the DSW data for each of the set of DSWs and the MCGUI data for each of the plurality of MCGUIs within each of the set of DSWs received from the second server.

4. The control system according to claim 3, wherein said real-time content includes at least one of a still image, a video image, an animated image, text, a graph, and a chart.

* * * * *